United States Patent [19]

McCombs et al.

[11] 3,876,467

[45] Apr. 8, 1975

[54] MODIFICATION OF STARCH

[75] Inventors: Frank P. McCombs; Reuben H. Bell, both of Granville; Kevin M. Foley, Hebron; John D. Crecca, Jr., Granville, all of Ohio

[73] Assignee: Owens-Corning Fiberglas Corporation, Toledo, Ohio

[22] Filed: Mar. 18, 1974

[21] Appl. No.: 452,291

[52] U.S. Cl. .................. 127/71; 117/126; 127/38; 127/70; 161/170
[51] Int. Cl. ............................................. C13l 1/10
[58] Field of Search .................. 127/38, 70, 71

[56] References Cited
UNITED STATES PATENTS

| | | | |
|---|---|---|---|
| 1,942,544 | 1/1934 | Fuller | 127/71 X |
| 2,148,525 | 2/1939 | Bauer | 127/38 |
| 2,274,789 | 3/1942 | Horesi | 127/38 |
| 2,565,404 | 8/1951 | Staerkle | 127/38 |
| 3,169,083 | 2/1965 | Taylor | 127/38 X |
| 3,200,012 | 8/1965 | Hay | 127/71 X |
| 3,224,903 | 12/1965 | Commerford | 127/71 X |
| 3,630,773 | 12/1971 | Schoch | 127/71 X |
| 3,630,775 | 12/1971 | Winkler | 127/71 |
| 3,748,151 | 7/1973 | Szymanski | 127/70 |

*Primary Examiner*—Morris O. Wolk
*Assistant Examiner*—Sidney Marantz
*Attorney, Agent, or Firm*—Carl G. Staelin; John W. Overman; Patrick P. Pacella

[57] ABSTRACT

A process for modification of starch under heat and pressure. The modified product is useful as an additive for aqueous resin systems. The process involves heating an aqueous starch mixture in an acid system to a temperature of about 150° to 350°F. in a closed pressure vessel. A pressure of at least 150 pounds per square inch is used. The temperature and pressure are sufficient to initiate a spontaneous reaction accompanied by an increase in pressure. The spontaneous reaction is allowed to proceed until a reaction pressure of at least 500 pounds per square inch is achieved. The reaction mixture is cooled and the modified starch recovered.

4 Claims, No Drawings

MODIFICATION OF STARCH

BACKGROUND OF THE INVENTION

Starch, present in every plant in the form of stored food, is one of the most abundant plant materials in the world. This abundance has lead to the extensive use of starch for production of cereal products and also for industrial applications. Industrial applications of starch include its use by textile, paper and laundry industries. In addition, a large amount of starch, especially corn starch, is converted into syrup (glucose solutions), from which dextrose can be recovered, and dextrin.

Dextrin corresponds to the chemical formula $C_6H_{10}O_5$ and is a complex mixture generally considered to be a chemical intermediate between starch and dextrose. It is known in the art that starch heated alone under atmospheric pressure to about 400°F. or to a lower temperature (approximately 300°F.) in the presence of acid vapors or other chemicals undergoes different degrees of degradation, principally forming dextrin and a little glucose*. The prior art also recognizes that starch can be heated with a large amount of dilute acid to undergo hydrolysis, yielding dextrin, maltose, and finally glucose. The starch is heated under a pressure of the order of about 30 to 45 pounds per square inch.

*Starch Its Sources, Production and Uses Reinhold Publishing Corporation, New York, N.Y., 1953 (pp. 308-302)

Glass fiber products of the so-called "wool" and "board" type have been known for many years. Such products are made by several different methods, all of which involve collecting a mass of fibers randomly intermeshed with one another, associating a binder with the intermeshed fibers, and curing the binder. The apparent density of the finished product can vary from one pound per cubic foot, or even less, if the binder associated with the mass of intermeshed glass fibers is merely cured, for example, in a suitable oven, to 20 pounds per cubic foot, or even higher, if the mass of intermeshed fibers is suitably compressed during cure of the associated binder.

Over the years, various binders and binder systems have been suggested for wool-and board-glass fiber products. For example, U.S. Pat. No. 2,252,157 acknowledges as prior art the use of such materials as asphalt, gypsum, starch, rosin, linseed oil, glue, sodium silicate, pitch and the like, indicating, however, that those prior art binders which are water soluble had proved unsatisfactory when subjected to moisture conditions. This patent then proceeds to disclose "that a fibrous batt having highly superior properties" can be produced by using, as a binder, a small amount of a thermosetting material such as a phenol-formaldehyde, a urea-formaldehyde, or the like condensate.

The instant invention is based upon the discovery that modification of starch by the disclosed and claimed process produces a reaction product useful in an aqueous resinous binder composition. Glass fiber products produced with a binder which includes this modified starch perform well under adverse moisture conditions.

DETAILED DESCRIPTION OF THE INVENTION

The following examples illustrate preferred embodiments of the present invention. Example 1 constitutes the best mode presently known to the inventors.

EXAMPLE 1

A stainless steel pressure reactor having an interior stirrer, cooling coils and a valved steam inlet was charged with 1,000 grams starch, 800 grams water and 120 grams adipic acid. The vessel was sealed and stirring of the contents was commenced.

Steam was introduced into the reactor until the pressure increased to 160 pounds per square inch at a temperature of 212°F. Application of steam pressure was continued; the temperature of the reaction mixture increased to 280°F. The steam inlet valve was closed. The reactor pressure showed a gradual increase to 240 pounds per square inch, and then increased rapidly to 610 pounds per square inch. Water was then introduced into the cooling coils after the temperature had reached 312°F. at a pressure of 610 pounds per square inch. The cooling water caused an immediate pressure drop to occur. After cooling to 180°F., the reactor was vented and the product removed therefrom. The product was a solution, tan to gray in color, having 22.7 percent solids and a viscosity of 25 cps.at 23°C. The pH of the solution was 3.3. This modified starch is referred to hereinafter as Type 1 starch.

A second portion of starch was modified as described below.

EXAMPLE 2

The pressure reactor described above was charged with 1,000 grams starch, 1,000 grams water and 120 grams adipic acid, and stirred.

Steam was introduced into the reactor, until the pressure increased to about 160 psi. at a temperature of 300°F. The reactor was cooled; pressure was released; and the reaction product was examined; the reactor was closed again and application of steam pressure was continued. The temperature of the reaction mixture increased to 180°F. at a pressure of 160 pounds per square inch. The steam inlet valve was closed. The pressure in the reactor showed a gradual increase to 215 pounds per square inch, and then increased rapidly over a 9 minute period to 610 pounds per square inch at a temperature of 205°F. Water was then introduced into the cooling coils, causing an immediate pressure drop to occur. After cooling to 180°F., the reactor was vented and the product removed therefrom. The product was a solution, tan to gray in color, having 23.3 percent solids content, and a viscosity of 50 cps at 23°C. This modified starch is hereinafter referred to as Type 2.

Type 1 starch and Type 2 starch can be used advantageously as constituents of aqueous binders used in producing glass fiber products. By way of example, such a binder can be made from a resin produced from 70 parts 52 percent formaldehyde, 37.6 parts phenol, 7.4 parts water, 4.0 parts calcium hydroxide, 12.6 parts melamine, 24.0 parts 50 percent solution of urea in water, and sulfuric acid, as indicated below. The condensate can be produced in a stainless steel reactor equipped with a propeller-type agitator and an interior, indirect heat transfer coil through which steam or cooling water is circulated, as required, to control temperature. Agitation is used throughout the condensation. The phenol and formaldehyde are added to the reactor first, and heated to 110°F., which temperature is maintained for 3½ hours, during which time the calcium hydroxide, as a slurry in the water, is added gradually.

The reaction mixture is then heated to 125°F. and maintained at that temperature for a period of 1 hour counting the time, approximately ten minutes, required to reach 125°F. The temperature is then increased to 150°F., and that temperature is maintained for a total of 2½ hours. The melamine is charged 2 hours after the reaction mixture reaches 150°F. At the end of the 2½ hour period at 150°F., cooling water is circulated through the indirect heat exchanger to lower the reaction temperature, and the urea solution is added rapidly. Cooling water is circulated until the condensate reaches a temperature of about 80°F., and the pH of the condensate is adjusted to about 7.5 by adding 20 percent sulfuric acid thereto.

A binder can be formulated in a mixing tank provided with a propeller-type agitator with 10 parts of water, 0.04 part of sodium hexametaphosphate, 0.004 part of an aminoalkylalkoxysilane*, a 0.07 part portion of ammonium sulfate, a 0.86 part portion of a 50 percent aqueous solution of urea, 5.97 parts of the resin produced as described in the preceding paragraph, 3.3 parts Type 1 starch, and 0.5 part of an oil emulsified with a non-ionic surfactant. The ingredients can be charged to the tank, with agitation, in the order named, and sufficient additional water can then be added to provide a binder composition of 16 percent solids.

*A suitable silane has the formula $NH_2C_2H_4NHC_3H_6 Si(—OCH_3)_3$.

A binder composition produced as described in the preceding paragraph can be sprayed into a region through which glass fibers are being projected onto a foraminous conveyor. The fibers can be collected in the form of a wool-like mass associated with the binder composition. The relative proportions of binder composition and fibers can be such that the binder, after cure thereof, constitutes approximately 11 percent of the total product. Cure can be accomplished in an oven maintained at a temperature of about 400°F. through which the glass fibers and associated binder are passed in a period of about 2 minutes, and in which the product is compressed sufficiently that the final product is a board-like mass of glass fibers bonded to one another at points of contact by a resite formed by cure of the binder composition, and has an apparent density of about 9 pounds per cubic foot, on the average.

Type 1 starch and Type 2 starch have been found, by means of a bench test which has been found to correlate well with the results achieved by making and testing glass fiber products as described above, to be superior to starch itself, as a binder ingredient, and even superior to a condensate produced as described above from phenol, formaldehyde, melamine and urea. The test involved preparing tensile test pieces from a mixture of 582 grams of glass spheres and 18 grams (on a dry solids basis) of the indicated condensate, of the indicated condensate plus the starch from which Type 1 starch and Type 2 starch were prepared or of the indicated condensate plus Type 1 starch or plus Type 2 starch. In all cases, a 0.4 gram addition of the aminoalkylalkoxysilane identified above was made. The spheres and the binder were mixed together, and the tensile test pieces were molded therefrom and cured in an oven for 7 minutes at 425°F. All of the test pieces were aged for sixteen hours, and their tensile strength was then determined: "dry" where the aging was under ambient conditions and "wet" where the aging was at 48°C. and 100 percent relative humidity. The binder systems investigated, and the results in terms of dry tensile strength, wet tensile strength and percent retained (100 times the wet tensile strength divided by the dry tensile strength) are set forth in the following Table:

TABLE I

| Sample | Resin | Starch Type | Amount | Tensile Strength Lbs. per square inch Dry | Wet | Percent Retained |
|---|---|---|---|---|---|---|
| 3 | 29.3g | — | — | 848 | 576 | 68 |
| 4 | 26.3g | Pearl corn starch | 1.8g | 848 | 602 | 71 |
| 5 | 26.3g | Type 1 | 8.1g | 648 | 808 | 125 |
| 6 | 26.3g | Type 2 | 8.1g | 880 | 728 | 83 |

The data in the foregoing Table indicate that both Type 1 starch and Type 2 starch, far from being "unsatisfactory when subjected to moisture conditions" (U.S. Pat. No. 2,225,009) can actually be used to improve the wet strengths of glass fiber products made from binders in which they are present.

It will be appreciated that a method for modifying starch is provided according to the instant invention. The method comprises the steps of heating starch in an aqueous acid system in a closed pressure vessel to a temperature of from about 150° to 350°F. at a pressure of at least 150 pounds per square inch and for a time sufficiently long to initiate a reaction which causes a spontaneous pressure increase in the vessel, allowing the reaction to continue until a reaction pressure of at least about 500 pounds per square inch is reached, and cooling and recovering the reaction product. Preferably, the acid of the aqueous acid system is a polybasic organic acid, most desirably a dibasic organic acid.

What we claim is:

1. A process for modifying starch which comprises the steps of heating starch in an aqueous acid system in a closed pressure vessel to a temperature of from about 150° to 350°F. at a pressure of at least 150 pounds per square inch and for a time sufficiently long to initiate a reaction which causes a spontaneous pressure increase in the vessel, allowing the reaction to continue until a reaction pressure of at least about 500 pounds per square inch is reached, and cooling and recovering the reaction product.

2. A process as claimed in claim 1 for modifying starch wherein the acid is a polybasic organic acid.

3. A process as claimed in claim 2 for modifying starch wherein the polybasic organic acid is dibasic.

4. A process as claimed in claim 3 for modifying starch wherein; the dibasic acid is adipic acid.

* * * * *